United States Patent [19]

King

[11] Patent Number: 5,092,305
[45] Date of Patent: Mar. 3, 1992

[54] APPARATUS AND METHOD FOR PROVIDING AN ALTERNATIVE FUEL SYSTEM FOR ENGINES

[75] Inventor: Steven R. King, San Antonio, Tex.

[73] Assignee: Gas Research Institute, Chicago, Ill.

[21] Appl. No.: 618,171

[22] Filed: Nov. 26, 1990

[51] Int. Cl.$^5$ .............................................. F02B 13/00
[52] U.S. Cl. .................... 123/575; 123/1 A; 123/27 GE
[58] Field of Search .............. 123/575, 527, 1 A, 1 R, 123/494, 525, 27 GE

[56] References Cited

U.S. PATENT DOCUMENTS

| | | | |
|---|---|---|---|
| 4,481,908 | 11/1984 | Iida | 123/1 A |
| 4,489,699 | 12/1984 | Poehlman | 123/525 |
| 4,495,930 | 1/1985 | Nakajima | 123/575 |
| 4,603,674 | 8/1986 | Tanaka | 123/575 |
| 4,606,322 | 8/1986 | Reid et al. | 123/575 |
| 4,625,698 | 12/1986 | Jamrog | 123/489 |
| 4,641,625 | 2/1987 | Smith | 123/575 |
| 4,679,538 | 7/1987 | Foster | 123/525 |
| 4,683,864 | 8/1987 | Bucci | 123/575 |
| 4,694,811 | 9/1987 | Bennett | 123/527 |
| 4,706,630 | 11/1987 | Wineland et al. | 123/478 |
| 4,876,988 | 10/1989 | Paul et al. | 123/1 A |
| 4,884,530 | 12/1989 | Boekhaus et al. | 123/1 A |
| 4,909,225 | 3/1990 | Gonze et al. | 123/494 |

Primary Examiner—Raymond A. Nelli
Attorney, Agent, or Firm—Baker & Botts

[57] ABSTRACT

An alternative fuel system that operates in conjunction with the primary fuel system to utilize the output from the existing or original equipment manufacturer's control module from the primary system, modifies that signal and controls a fuel supply valve for the alternative fuel so that the proper quantity of alternative fuel is supplied to the engine.

7 Claims, 1 Drawing Sheet

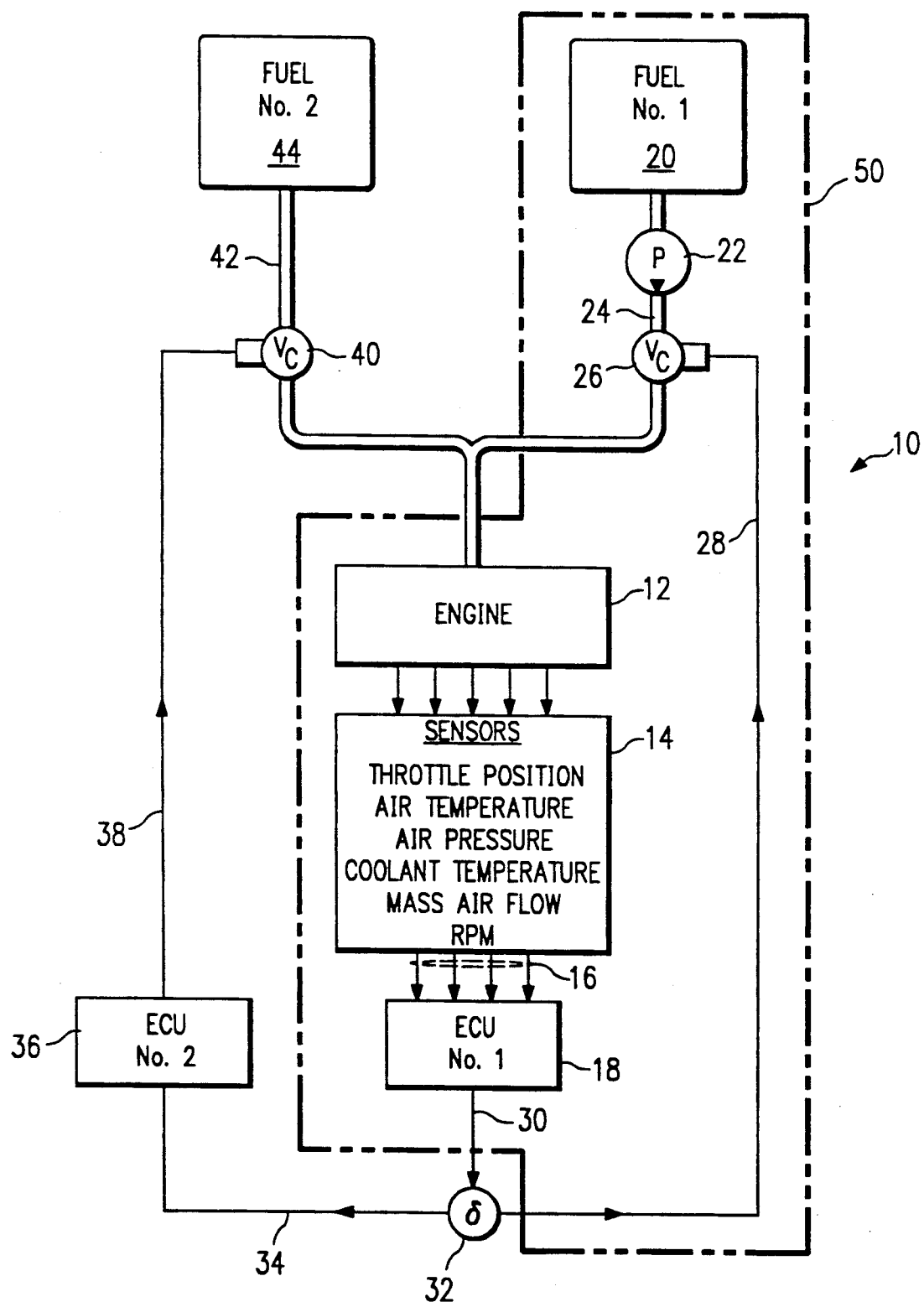

APPARATUS AND METHOD FOR PROVIDING AN ALTERNATIVE FUEL SYSTEM FOR ENGINES

TECHNICAL FIELD OF THE INVENTION

This invention relates generally to fuel systems for electronically controlled fuel injection systems for engines. More particularly, but not by way of limitation, this invention relates to apparatus and method for providing an alternative fuel systems for engines having fuel injection systems.

BACKGROUND OF THE INVENTION

It is highly desirable to be able to operate engines on alternative fuels. Currently, federal regulations require that the electronic control systems on new vehicles remain intact. That is, they cannot be modified to accept an alternative fuel supply system. Accordingly, the practice has been to provide the factory installed fuel system or primary fuel system and to install a totally separate and free-standing alternative fuel system.

As a result of the above, it has been necessary to provide separate sensors for the various engine functions that are utilized in determining the amount of fuel to be supplied to the engine, a separate electronic control module that receives signals from such sensors and converts them into a usable fuel signal. The provision of such apparatus is expensive and unnecessary.

U.S. Pat. No. 4,641,625 issued Feb. 10, 1987 to Peter R. Smith illustrates a fuel control system wherein liquid fuel and gaseous fuel are both utilized in the engine. In this instance, totally separate flow control systems exist side by side in connection with the engine. The systems are interrelated to the extent that the proportions of a liquid fuel and gaseous fuel can be varied in the event that it is desirable to combine the two fuels.

U.S. Pat. Nos. 4,481,908 issued Nov. 13, 1984 to Katsuyoshi Iida and 4,706,630 issued Nov. 17, 1987 to Wineland, et al. are illustrative of the many patents issued related to mixtures of two fuels and the methods of controlling the proportions of the mixtures in engines.

SUMMARY OF THE INVENTION

An object of this invention is to provide a method and apparatus for the utilization of alternative fuels in engines wherein the fuels are not mixed.

A further object of the invention is to provide a method and apparatus for providing alternative fuel to an engine wherein the original equipment fuel system remains intact without modification as required by federal regulations.

This invention then provides a fuel system for an electronically controlled fuel injection system for an engine including: a plurality of sensors for sensing various engine conditions and transmitting sensor signals related thereto; a first control module for receiving the signals and transmitting a first fuel control signal that corresponds to said sensor signals; and a second control module for receiving the first fuel control signal and transmitting a second fuel control signal corresponding to the first fuel control signal. A first fuel control valve is connected with the engine, with a first fuel supply and with the first control module to receive the first fuel control signal for supplying controlled quantities of the first fuel to the engine. A second fuel control valve is connected with the engine, with a second fuel supply, and with the second control module to receive the second fuel control signal for supplying controlled quantities of the second fuel to the engine. A selector is provided for determining which of the fuels is to be supplied to the engine.

In another aspect, this invention provides an alternative fuel system for use with an engine that has a primary fuel supply, a primary fuel control valve connected to the engine and to the fuel supply, a primary control module for transmitting a fuel control signal to the primary control valve, and a plurality of sensors for sensing selected engine functions and transmitting a primary fuel signal indicative thereof to the primary control module. The alternative fuel system includes an alternative fuel supply, an alternative fuel control valve connected to the alternative fuel supply and to the engine, and an alternative control module for receiving the primary fuel signal and transmitting an alternative fuel signal related to the primary fuel signal to the alternative fuel control valve for controlling the quantity of alternative fuel supplied to the engine. A selector is provided for determining which of the fuels is supplied to the engine.

In still another aspect, this invention provides a method for supplying alternative fuels to an engine that includes the steps of sensing preselected engine functions and transmitting signals related thereto to a primary fuel control module, generating a primary fuel control signal in the primary control module, transmitting a primary fuel control signal to a primary fuel control valve connected to a supply of primary fuel for the engine, simultaneously transmitting the primary fuel control signal to an alternative control module, generating an alternative fuel control signal in the alternative control module, and transmitting the alternative control signal to the alternative fuel control valve connected to a supply of alternative fuel for the engine, and selecting which of the fuels is to be supplied to the engine.

BRIEF DESCRIPTION OF THE DRAWINGS

The foregoing and additional objects and advantages of the invention will be more fully understood when read in conjunction with the accompanying drawing wherein the single figure illustrated is a schematic diagram showing an alternative fuel system that is constructed in accordance with the invention.

DETAILED DESCRIPTION OF THE PREFERRED EMBODIMENT

Referring to the single figure of the drawing, shown therein and generally designated by the reference character 10 is a fuel control system that is constructed in accordance with the invention. The system 10 is illustrated as being connected with an engine 12.

The engine 12 is provided with a plurality of sensors 14 which desirably sense such engine functions as throttle position, air temperature, air pressure, coolant temperature, mass air flow, and engine rpm. Manifestly, any desired engine function can be sensed that relates to the determination of the proper fuel supply for the engine 12. The sensors 14 are constructed to transmit a plurality of signals 16 to an electronic control module 18 which is normally factory installed on a vehicle (not shown) which contains the engine 12. The control module 18 is used with the engine 12 for the purpose of controlling the supply of fuel to the engine 12 from a first or primary fuel source 20.

If the primary fuel 20 is a liquid, a fuel pump 22 is located in a fuel line 24 that connects the primary fuel 20 to the engine 12. Also located in the fuel line 24 will be a control valve 26 which is usually of the solenoid type.

To control the amount of primary fuel 2 introduced into the engine 12, the solenoid control valve 26 is connected by a conductor 28 with the output 30 from the primary or first control module 18. It will be noted that a switch 32 has been interposed in the conductor 28.

The switch 32 will be of a type that will transmit the output signal 30 over the conductor 28 to the control valve 26, or transmit the output signal 30 over a conductor 34 to a second or alternative control module 36. An output 38 from the control module 36 is transmitted to a second or alternative fuel control valve 40, which could be, but is not limited to, a solenoid type valve. Other possible fuel control valves include a continuous-flow stepper-motor driven valve or a continuous-flow proportional solenoid valve.

The control valve 40 is interposed in a fuel line 42 that connects a second or alternative fuel supply 44 with the engine 12. It should be pointed out that the valves 26 and 40 are preferably of a type that are normally closed so that no fuel will be supplied to the engine 12 from either of the fuel sources unless one of the valves has been actuated by the output 30 of the module 18 or the output 38 from the module 36.

Reverting to the second or alternative fuel control valve 40, it should be understood that that module is capable of receiving the output 30 from the first control module 18 and converting the output signal 30 into a signal 38 that is appropriate to actuate the control valve 40. Such signal change is necessary since the fuels 20 and 44 may have different caloric values as well as, in many cases, one being liquid and the other gaseous. In order to provide the most accurate control of the valves 26 and 40, the outputs 30 and 38 are preferably, but not limited to, pulse width modulated.

As originally supplied by the vehicle manufacturer, the engine 12 and fuel supply system therefor would be as illustrated within phantom line 50. Accordingly, it is only necessary to connect the fuel line 42 from the alternative fuel source 44 to the engine 12 and to interpose the selector switch 32 so that the output 30 from the primary control module 18 can be directed either to the control valve 26 or to the control valve 40.

Stated another way, the alternative fuel system, which may be packaged in kit form, includes the alternative fuel supply 44, the fuel line 42, the control valve 40, alternative fuel control module 36, conductor 34 and selector switch 32. The primary fuel control system remains intact so that primary fuel can be supplied to the engine precisely as designed by the equipment manufacturer.

OPERATION OF THE PREFERRED EMBODIMENT

With the engine 12 operating, the sensors 14 are transmitting signals 16 to the primary control module 18 of the selected functions. In the control module 18, such signals are combined and utilized to provide an output 30 that is a fuel control signal which is transmitted via the switch 32 and conductor 28 to the control valve 26. The output signal 30 then actuates the control valve 26 appropriately to provide for the supply of the primary fuel 20 through the fuel pump 22 and fuel line 24 to the engine 12. This is the primary fuel operation of the engine 12.

Should it become desirable to operate the engine 12 on the alternative fuel 44, the operator changes the switch 32 to a position to select the alternative fuel system. Switching between the fuels could be made automatic if the appropriate fuel level sensors (not shown) and switches (not shown) were provided in the system. When this occurs, the output signal 30 from the primary control module 18 is transmitted to the alternative fuel control module 36 wherein the signal is converted to an output 38 that is appropriate to actuate control valve 40 to supply the proper amount of alternative fuel 44 to the engine 12. Upon opening of the valve 40, the alternative fuel 44 is supplied through the fuel line 42 to the engine 12.

On current production automobiles, output signal 30 will most likely be a pulse-width modulated electrical signal. One method for modifying the output signal 30 within the alternative control module 36 is to measure the pulse-width in milliseconds of output signal 30 and the frequency of the recurring pulse-width signals, and generate a proportional current output 38 to drive a continuous-flow proportional solenoid 40. Another method for modifying signal 30 to drive the alternative fuel control valve 40 is to measure the pulse-width of output 30 in time base and multiply this measured time by an appropriate factor to provide proper fuel flow calibration of the pulse-width modulated fuel control valve 40. Other combinations of fuel flow valves and signal modification in the control modules also exist.

If it is desired to run on the primary fuel 20, it is only necessary to switch the selector switch 32 which cuts out the alternative fuel system and reinstates the primary fuel system entirely. The fuel system 10 adapts easily to a wide variety of engine types and sizes since the system 10 relies on the original control module and sensors to determine the correct flow for proper engine operation. The primary system remains a closed fuel control system when the original engine is already so equipped and, since the original fuel system is retained, the engine can be operated on a standard liquid fuel or on an alternative fuel. Also, the diagnostics provided within the primary control module are retained and functional.

It will be understood that the foregoing detailed description is presented by way of example only and that many modifications and changes can be made thereto without departing from the spirit and scope of the invention.

WHAT IS CLAIMED IS:

1. A fuel system for an electronically controlled fuel injection system for an engine including:
    a plurality of sensors for sensing selected engine conditions and transmitting sensor signals related thereto;
    a first control module for receiving said sensor signals and transmitting a first fuel control signal corresponding to said sensor signals;
    a second control module for receiving said first fuel control signal and transmitting a second fuel control signal corresponding to said first fuel control signal;
    a first fuel control valve connected with said engine, with a first fuel supply and connected with said first control module to receive said first fuel control signal for supplying controlled quantities of first fuel to said engine;

a second fuel control valve connected with said engine, with a second fuel supply and connected with said second control module to receive said second fuel control signal for supplying controlled quantities of second fuel to said engine; and selector means for selectively supplying one of said fuels to said engine.

2. The system of claim 1 wherein:

said second control module includes means for transmitting said second fuel control signal with a modulated pulse width; and wherein said second fuel control valve is responsive to said second fuel control signal to vary the quantity of fuel supplied to said engine.

3. An alternative fuel system for use With an engine having a primary fuel supply, a primary fuel control valve connected to the engine and to the fuel supply, a primary control module for transmitting a fuel control signal to said primary control valve, and a plurality of sensors for sensing selected engine functions and transmitting a primary fuel signal indicative thereof to said primary control module, said alternative fuel system including:

an alternative fuel supply;

an alternative fuel control valve connected to said alternative fuel supply and for connection to the engine;

an alternative control module for receiving said primary fuel signal and transmitting an alternative fuel signal related to said primary fuel signal to said alternative fuel control valve for controlling the quantity of alternative fuel supplied to the engine; and selector means for selectively supplying one of said fuels to said engine.

4. The system of claim 3 wherein:

said alternative control module includes means for transmitting said alternative fuel control signal with a modulated pulse width; and said alternative fuel control valve is responsive to said alternative fuel control signal to vary the quantity of fuel supplied to said engine.

5. A method for supplying alternative fuels to an engine including the steps of:

sensing preselected engine functions and transmitting signals related thereto to a primary fuel control module;

generating a primary fuel control signal in said primary control module;

transmitting a primary fuel control signal to a primary fuel control valve connected to supply primary fuel to the engine;

simultaneously transmitting said primary fuel control signal to an alternative control module;

transmitting an alternative fuel control signal to an alternative fuel control valve connected to supply alternative fuel to said engine;

generating an alternative fuel control signal in said alternative control module; and selecting which of said fuels is supplied to said engine.

6. The method of claim 5 wherein the step of transmitting an alternative fuel control signal includes pulse width modulation to cause the alternative fuel control valve to vary the quantity of alternative fuel supplied to the engine.

7. A method of supplying alternative fuels to an engine equipped with a primary fuel injection system including a primary fuel control valve connected to the engine and to a primary fuel supply, a primary fuel control module for transmitting a primary fuel control signal to the primary fuel control valve, and a plurality of sensors for sensing selected engine functions, the method comprising:

sensing the selected engine functions and transmitting sensor signals indicative thereof to the primary control module;

generating the primary fuel control signal in the primary fuel control module corresponding to the sensor signals;

directing the primary fuel control signal to an alternative fuel module;

modifying the primary fuel control signal in the alternative fuel control module; and transmitting the modified signal as an alternative fuel control signal to an alternative fuel control valve connected to an alternative fuel supply and to the engine.

* * * * *

UNITED STATES PATENT AND TRADEMARK OFFICE
CERTIFICATE OF CORRECTION

PATENT NO.   : 5,092,305
DATED        : March 3, 1992
INVENTOR(S)  : Steven R. King It is certified that error appears in the above-identified patent and that said Letters Patent is hereby corrected as shown below:

Column 3, line 6, after "fuel", delete "2" and insert -- 20 --.

Column 3, line 7, after "engine", delete "!2" and insert -- 12 --.

Column 3, line 45, after "engine", delete "!2" and insert -- 12 --.

Column 5, line 15, after "use", delete "With" and insert -- with --.

Signed and Sealed this

Seventh Day of September, 1993

Attest:

BRUCE LEHMAN

Attesting Officer

Commissioner of Patents and Trademarks